(12) United States Patent  
Mullen et al.

(10) Patent No.: US 8,814,050 B1
(45) Date of Patent: Aug. 26, 2014

(54) ADVANCED PAYMENT OPTIONS FOR POWERED CARDS AND DEVICES

(71) Applicants: Jeffrey D. Mullen, Pittsburgh, PA (US); Philip W. Yen, Cupertino, CA (US)

(72) Inventors: Jeffrey D. Mullen, Pittsburgh, PA (US); Philip W. Yen, Cupertino, CA (US)

(73) Assignee: Dynamics Inc., Pittsburgh, PA (US)

( * ) Notice: Subject to any disclaimer, the term of this patent is extended or adjusted under 35 U.S.C. 154(b) by 0 days.

(21) Appl. No.: 13/850,463

(22) Filed: Mar. 26, 2013

Related U.S. Application Data

(63) Continuation of application No. 12/908,050, filed on Oct. 20, 2010, now Pat. No. 8,523,059.

(60) Provisional application No. 61/253,249, filed on Oct. 20, 2009.

(51) Int. Cl.
*G06K 19/00* (2006.01)

(52) U.S. Cl.
USPC ......................................................... 235/487

(58) Field of Classification Search
USPC ......................................................... 235/487
See application file for complete search history.

(56) References Cited

U.S. PATENT DOCUMENTS

| | | |
|---|---|---|
| 4,353,064 A | 10/1982 | Stamm |
| 4,394,654 A | 7/1983 | Hofmann-Cerfontaine |
| 4,614,861 A | 9/1986 | Pavlov et al. |
| 4,667,087 A | 5/1987 | Quintana |
| 4,701,601 A | 10/1987 | Francini et al. |
| 4,720,860 A | 1/1988 | Weiss |
| 4,786,791 A | 11/1988 | Hodama |
| 4,791,283 A | 12/1988 | Burkhardt |
| 4,797,542 A | 1/1989 | Hara |
| 5,038,251 A | 8/1991 | Sugiyama et al. |
| 5,168,520 A | 12/1992 | Weiss |
| 5,237,614 A | 8/1993 | Weiss |
| 5,276,311 A | 1/1994 | Hennige |
| 5,347,580 A | 9/1994 | Molva et al. |
| 5,361,062 A | 11/1994 | Weiss et al. |
| 5,412,199 A | 5/1995 | Finkelstein et al. |
| 5,434,398 A | 7/1995 | Goldberg |

(Continued)

FOREIGN PATENT DOCUMENTS

| | | |
|---|---|---|
| JP | 05210770 A | 8/1993 |
| WO | WO9852735 | 11/1998 |

(Continued)

OTHER PUBLICATIONS

U.S. Appl. No. 60/594,300, Poidomani et al.

(Continued)

*Primary Examiner* — Christle I Marshall

(57) ABSTRACT

Advanced payment applications are provided to improve the functionality of cards and devices. For example, a user interface may be placed on a card (e.g., a physical button) or a telephonic device (e.g., a virtual button on a capacitive touch screen). Manual input provided to this user interface may, for example, cause an item purchased on credit to be paid via one or more user accounts (e.g., bank accounts) as soon as the next credit statement posts or becomes due. A user may decide to pay for an item when the next statement becomes due at a point-of-sale magnetic stripe reader by using an interface on a card to cause information to be communicated through the infrastructure indicative of a user's desire to pay the for an item when the next statement becomes due.

20 Claims, 8 Drawing Sheets

(56) References Cited

U.S. PATENT DOCUMENTS

| | | | |
|---|---|---|---|
| 5,434,405 | A | 7/1995 | Finkelstein et al. |
| 5,478,994 | A | 12/1995 | Rahman |
| 5,479,512 | A | 12/1995 | Weiss |
| 5,484,997 | A | 1/1996 | Haynes |
| 5,485,519 | A | 1/1996 | Weiss |
| 5,585,787 | A | 12/1996 | Wallerstein |
| 5,591,949 | A | 1/1997 | Bernstein |
| 5,608,203 | A | 3/1997 | Finkelstein et al. |
| 5,623,552 | A | 4/1997 | Lane |
| 5,657,388 | A | 8/1997 | Weiss |
| 5,834,747 | A | 11/1998 | Cooper |
| 5,834,756 | A | 11/1998 | Gutman et al. |
| 5,856,661 | A | 1/1999 | Finkelstein et al. |
| 5,864,623 | A | 1/1999 | Messina et al. |
| 5,907,142 | A | 5/1999 | Kelsey |
| 5,913,203 | A | 6/1999 | Wong et al. |
| 5,937,394 | A | 8/1999 | Wong et al. |
| 5,955,021 | A | 9/1999 | Tiffany, III |
| 5,956,699 | A | 9/1999 | Wong et al. |
| 6,025,054 | A | 2/2000 | Tiffany, III |
| 6,045,043 | A | 4/2000 | Bashan et al. |
| 6,076,163 | A | 6/2000 | Hoffstein et al. |
| 6,085,320 | A | 7/2000 | Kaliski, Jr. |
| 6,095,416 | A | 8/2000 | Grant et al. |
| 6,130,621 | A | 10/2000 | Weiss |
| 6,145,079 | A | 11/2000 | Mitty et al. |
| 6,157,920 | A | 12/2000 | Jakobsson et al. |
| 6,161,181 | A | 12/2000 | Haynes, III et al. |
| 6,176,430 | B1 | 1/2001 | Finkelstein et al. |
| 6,182,894 | B1 | 2/2001 | Hackett et al. |
| 6,189,098 | B1 | 2/2001 | Kaliski |
| 6,199,052 | B1 | 3/2001 | Mitty et al. |
| 6,206,293 | B1 | 3/2001 | Gutman et al. |
| 6,240,184 | B1 | 5/2001 | Huynh et al. |
| 6,241,153 | B1 | 6/2001 | Tiffany, III |
| 6,256,873 | B1 | 7/2001 | Tiffany, III |
| 6,269,163 | B1 | 7/2001 | Rivest et al. |
| 6,286,022 | B1 | 9/2001 | Kaliski et al. |
| 6,308,890 | B1 | 10/2001 | Cooper |
| 6,313,724 | B1 | 11/2001 | Osterweil |
| 6,389,442 | B1 | 5/2002 | Yin et al. |
| 6,393,447 | B1 | 5/2002 | Jakobsson et al. |
| 6,411,715 | B1 | 6/2002 | Liskov et al. |
| 6,446,052 | B1 | 9/2002 | Juels |
| 6,460,141 | B1 | 10/2002 | Olden |
| 6,592,044 | B1 | 7/2003 | Wong et al. |
| 6,607,127 | B2 | 8/2003 | Wong |
| 6,609,654 | B1 | 8/2003 | Anderson et al. |
| 6,631,849 | B2 | 10/2003 | Blossom |
| 6,655,585 | B2 | 12/2003 | Shinn |
| 6,681,988 | B2 | 1/2004 | Stack et al. |
| 6,705,520 | B1 | 3/2004 | Pitroda et al. |
| 6,755,341 | B1 | 6/2004 | Wong et al. |
| 6,764,005 | B2 | 7/2004 | Cooper |
| 6,769,618 | B1 | 8/2004 | Finkelstein |
| 6,805,288 | B2 | 10/2004 | Routhenstein et al. |
| 6,811,082 | B2 | 11/2004 | Wong |
| 6,813,354 | B1 | 11/2004 | Jakobsson et al. |
| 6,817,532 | B2 | 11/2004 | Finkelstein |
| 6,873,974 | B1 | 3/2005 | Schutzer |
| 6,902,116 | B2 | 6/2005 | Finkelstein |
| 6,970,070 | B2 | 11/2005 | Juels et al. |
| 6,980,969 | B1 | 12/2005 | Tuchler et al. |
| 6,985,583 | B1 | 1/2006 | Brainard et al. |
| 6,991,155 | B2 | 1/2006 | Burchette, Jr. |
| 7,013,030 | B2 | 3/2006 | Wong et al. |
| 7,035,443 | B2 | 4/2006 | Wong |
| 7,039,223 | B2 | 5/2006 | Wong |
| 7,044,394 | B2 | 5/2006 | Brown |
| 7,051,929 | B2 | 5/2006 | Li |
| 7,083,094 | B2 | 8/2006 | Cooper |
| 7,100,049 | B2 | 8/2006 | Gasparini et al. |
| 7,100,821 | B2 | 9/2006 | Rasti |
| 7,111,172 | B1 | 9/2006 | Duane et al. |
| 7,114,652 | B2 | 10/2006 | Moullette et al. |
| 7,136,514 | B1 | 11/2006 | Wong |
| 7,140,550 | B2 | 11/2006 | Ramachandran |
| 7,163,153 | B2 | 1/2007 | Blossom |
| 7,195,154 | B2 | 3/2007 | Routhenstein |
| 7,197,639 | B1 | 3/2007 | Juels et al. |
| 7,219,368 | B2 | 5/2007 | Juels et al. |
| 7,225,537 | B2 | 6/2007 | Reed |
| 7,225,994 | B2 | 6/2007 | Finkelstein |
| 7,246,752 | B2 | 7/2007 | Brown |
| 7,298,243 | B2 | 11/2007 | Juels et al. |
| 7,334,732 | B2 | 2/2008 | Cooper |
| 7,337,326 | B2 | 2/2008 | Palmer et al. |
| 7,346,775 | B2 | 3/2008 | Gasparini et al. |
| 7,356,696 | B1 | 4/2008 | Jakobsson et al. |
| 7,357,319 | B1 | 4/2008 | Lin et al. |
| 7,359,507 | B2 | 4/2008 | Kaliski |
| 7,360,688 | B1 | 4/2008 | Harris |
| 7,363,494 | B2 | 4/2008 | Brainard et al. |
| 7,380,710 | B2 | 6/2008 | Brown |
| 7,398,253 | B1 | 7/2008 | Pinnell |
| 7,404,087 | B2 | 7/2008 | Teunen |
| 7,424,570 | B2 | 9/2008 | D'Albore et al. |
| 7,427,033 | B1 | 9/2008 | Roskind |
| 7,454,349 | B2 | 11/2008 | Teunen et al. |
| 7,461,250 | B1 | 12/2008 | Duane et al. |
| 7,461,399 | B2 | 12/2008 | Juels et al. |
| 7,472,093 | B2 | 12/2008 | Juels |
| 7,472,829 | B2 | 1/2009 | Brown |
| 7,494,055 | B2 | 2/2009 | Fernandes et al. |
| 7,502,467 | B2 | 3/2009 | Brainard et al. |
| 7,502,933 | B2 | 3/2009 | Jakobsson et al. |
| 7,503,485 | B1 | 3/2009 | Routhenstein |
| 7,516,492 | B1 | 4/2009 | Nisbet et al. |
| 7,523,301 | B2 | 4/2009 | Nisbet et al. |
| 7,530,495 | B2 | 5/2009 | Cooper |
| 7,532,104 | B2 | 5/2009 | Juels |
| 7,543,739 | B2 | 6/2009 | Brown et al. |
| 7,559,464 | B2 | 7/2009 | Routhenstein |
| 7,562,221 | B2 | 7/2009 | Nystrom et al. |
| 7,562,222 | B2 | 7/2009 | Gasparini et al. |
| 7,580,898 | B2 | 8/2009 | Brown et al. |
| 7,584,153 | B2 | 9/2009 | Brown et al. |
| 7,591,426 | B2 | 9/2009 | Osterweil et al. |
| 7,591,427 | B2 | 9/2009 | Osterweil |
| 7,602,904 | B2 | 10/2009 | Juels et al. |
| 7,606,764 | B1 * | 10/2009 | Mancini ............... 705/39 |
| 7,631,804 | B2 | 12/2009 | Brown |
| 7,639,537 | B2 | 12/2009 | Sepe et al. |
| 7,641,124 | B2 | 1/2010 | Brown et al. |
| 7,660,902 | B2 | 2/2010 | Graham et al. |
| 7,828,207 | B2 | 11/2010 | Cooper |
| 8,511,548 | B1 * | 8/2013 | Mori et al. ............... 235/380 |
| 2001/0034702 | A1 | 10/2001 | Mockett et al. |
| 2001/0047335 | A1 | 11/2001 | Arndt et al. |
| 2002/0059114 | A1 | 5/2002 | Cockrill et al. |
| 2002/0082989 | A1 | 6/2002 | Fife et al. |
| 2002/0096570 | A1 | 7/2002 | Wong et al. |
| 2002/0120583 | A1 | 8/2002 | Keresman, III et al. |
| 2003/0034388 | A1 | 2/2003 | Routhenstein et al. |
| 2003/0052168 | A1 | 3/2003 | Wong |
| 2003/0057278 | A1 | 3/2003 | Wong |
| 2003/0116635 | A1 | 6/2003 | Taban |
| 2003/0152253 | A1 | 8/2003 | Wong |
| 2003/0163287 | A1 | 8/2003 | Vock et al. |
| 2003/0173409 | A1 | 9/2003 | Vogt et al. |
| 2003/0179909 | A1 | 9/2003 | Wong et al. |
| 2003/0179910 | A1 | 9/2003 | Wong |
| 2003/0226899 | A1 | 12/2003 | Finkelstein |
| 2004/0035942 | A1 | 2/2004 | Silverman |
| 2004/0133787 | A1 | 7/2004 | Doughty |
| 2004/0162732 | A1 | 8/2004 | Rahim et al. |
| 2004/0172535 | A1 | 9/2004 | Jakobsson |
| 2004/0177045 | A1 | 9/2004 | Brown |
| 2005/0043997 | A1 | 2/2005 | Sahota et al. |
| 2005/0080747 | A1 | 4/2005 | Anderson et al. |
| 2005/0086160 | A1 | 4/2005 | Wong et al. |
| 2005/0086177 | A1 | 4/2005 | Anderson et al. |
| 2005/0116026 | A1 | 6/2005 | Burger et al. |
| 2005/0119940 | A1 | 6/2005 | Concilio et al. |

(56) References Cited

U.S. PATENT DOCUMENTS

| | | |
|---|---|---|
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner et al. |
| 2006/0161435 A1 | 7/2006 | Atef et al. |
| 2006/0163353 A1 | 7/2006 | Moulette et al. |
| 2006/0174104 A1 | 8/2006 | Crichton et al. |
| 2006/0196931 A1 | 9/2006 | Holtmanns et al. |
| 2006/0256961 A1 | 11/2006 | Brainard et al. |
| 2007/0034700 A1 | 2/2007 | Poidomani et al. |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0040271 A1 | 2/2008 | Hammad et al. |
| 2008/0040276 A1 | 2/2008 | Hammad et al. |
| 2008/0058016 A1 | 3/2008 | Di Maggio et al. |
| 2008/0059379 A1 | 3/2008 | Ramaci et al. |
| 2008/0096326 A1 | 4/2008 | Reed |
| 2008/0126398 A1 | 5/2008 | Cimino |
| 2008/0128515 A1 | 6/2008 | Di Iorio |
| 2008/0147496 A1 | 6/2008 | Bal et al. |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0108064 A1 | 4/2009 | Fernandes et al. |
| 2009/0112766 A1* | 4/2009 | Hammad et al. ............... 705/44 |
| 2009/0150295 A1 | 6/2009 | Hatch et al. |
| 2009/0152365 A1 | 6/2009 | Li et al. |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2011/0028184 A1 | 2/2011 | Cooper |
| 2011/0060640 A1* | 3/2011 | Thompson et al. ........ 705/14.36 |
| 2011/0240748 A1 | 10/2011 | Doughty et al. |
| 2012/0150611 A1 | 6/2012 | Isaacson et al. |

FOREIGN PATENT DOCUMENTS

| | | |
|---|---|---|
| WO | WO0247019 | 6/2002 |
| WO | WO2006066322 | 6/2006 |
| WO | WO2006080929 | 8/2006 |
| WO | WO2006105092 | 10/2006 |
| WO | WO2006116772 | 11/2006 |
| WO | WO2008064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack/org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
English translation of JP 05210770 A.

* cited by examiner

600

604 — YOU HAVE REQUESTED TO COMPLETE A TRANSACTION USING REWARD POINTS. IS THAT CORRECT? (Enter (1) for Yes, (2) for No)

IF NO, PLEASE MAKE A NEW SELECTION:
(1) Installment Pay
(2) Regular Pay

YOU HAVE REQUESTED TO COMPLETE A TRANSACTION USING INSTALLMENT PAY.

THE DEFAULT NUMBER OF INSTALLMENTS IS 3?

Please enter:
(1) to confirm default selection
(2) to change default to 6 installments
(3) to change default to 9 installments

ADVANCED PAYMENT OPTIONS FOR POWERED CARDS AND DEVICES

CROSS-REFERENCE TO RELATED APPLICATION

This application is a continuation of U.S. patent application Ser. No. 12/908,050, filed on Oct. 20, 2010, which claims the benefit of U.S. Provisional Patent Application No. 61/253,249, titled "Advanced Payment Options for Powered Cards and Devices," filed Oct. 20, 2009, each of which is hereby incorporated by reference herein in its entirety.

BACKGROUND OF THE INVENTION

This invention relates to magnetic cards and devices and associated payment systems.

SUMMARY OF THE INVENTION

A card may include a dynamic magnetic communications device. Such a dynamic magnetic communications device may take the form of a magnetic encoder or a magnetic emulator. A magnetic encoder may change the information located on a magnetic medium such that a magnetic stripe reader may read changed magnetic information from the magnetic medium. A magnetic emulator may generate electromagnetic fields that directly communicate data to a magnetic stripe reader. Such a magnetic emulator may communicate data serially to a read-head of the magnetic stripe reader.

All, or substantially all, of the front as well as the back of a card may be a display (e.g., bi-stable, non bi-stable, LCD, LED, or electrochromic display). Electrodes of a display may be coupled to one or more capacitive touch sensors such that a display may be provided as a touch-screen display. Any type of touch-screen display may be utilized. Such touch-screen displays may be operable of determining multiple points of touch. Accordingly, a barcode may be displayed across all, or substantially all, of a surface of a card. In doing so, computer vision equipment such as barcode readers may be less susceptible to errors in reading a displayed barcode.

A card may include a number of output devices to output dynamic information. For example, a card may include one or more RFIDs or IC chips to communicate to one or more RFID readers or IC chip readers, respectively. A card may include devices to receive information. For example, an RFID and IC chip may both receive information and communicate information to an RFID and IC chip reader, respectively. A device for receiving wireless information signals may be provided. A light sensing device or sound sensing device may be utilized to receive information wirelessly. A card may include a central processor that communicates data through one or more output devices simultaneously (e.g., an RFID, IC chip, and a dynamic magnetic stripe communications device). The central processor may receive information from one or more input devices simultaneously (e.g., an RFID, IC chip, dynamic magnetic stripe devices, light sensing device, and a sound sensing device). A processor may be coupled to surface contacts such that the processor my perform the processing capabilities of, for example, an EMV chip. The processor may be laminated over and not exposed such that such a processor is not exposed on the surface of the card.

A card may be provided with a button in which the activation of the button causes a code to be communicated through a dynamic magnetic stripe communications device (e.g., the subsequent time a read-head detector on the card detects a read-head). The code may be indicative of a user's desire to pay for a purchase immediately when the user's next periodic credit card statement is available (e.g., at the next monthly credit card statement). An online service may be provided that allows a user to indicate categories of purchases and/or specific purchases upon which payment will be made as soon as the next credit card statement is available.

A card may be provided with a button associated with a code indicative of placing an associated purchase into an installment payment plan. The first installment may be due at the next due date. An online service (e.g., website) may be provided that allows a user to review previous credit card purchases and/or categories of credit card purchases and define installment payment plans for such purchases. Different buttons may be utilized to communicate different codes associated with different types of installment plans (e.g., one button may be 3 equal installments over the next 3 months while another button may be 6 equal installments over the next 6 months).

A card may be provided with a button associated with a code indicative of paying the most recent credit card bill for a user. Accordingly, at any time, a user may pay his/her credit card bill without having to use, for example, an online service (e.g., log into a webpage).

A card may be provided with a button associated with a code indicative of a request for information associated with an alert update feature. Such information may include, for example, synchronization information such that internal timing circuitry may be resynchronized. An alert may be pre-programmed into a card, for example, that is indicative of the times when bills will be due for a credit card statement (e.g., the first of every month). Accordingly, an information receiver (e.g., a light-based information receiver) may receive information after an alert update feature button is pressed (e.g., to resynchronize a clock on a card). A clock internal to the card may indicate to a user that a bill is due based on this received (or pre-set information). Such an alert may take the form of, for example, the activation of an LED (e.g., a blinking LED) or the presence of particular indicia (e.g., alert indicia) on a display of a card. A card may be preprogrammed with a particular day of a month (e.g., $6^{th}$ of every month) and a user may press a button to view this payment date on a card.

A card may be provided with a button associated with a code indicative of paying for a purchase using rewards points and/or rewards cash. Accordingly, for example, a user may select a button on the card to indicate that rewards are to be used to complete a particular transaction (e.g., point-of-sale transaction) rather than some other account type (e.g., credit or debit) that may otherwise be used to complete the transaction.

A card and/or one or more accounts associated with a card may be associated with a card holder's mobile communication device (e.g., mobile phone). Accordingly, for example, a user may opt to receive confirmations (e.g., text message updates) once a payment option is selected.

Once a text confirmation of the selected payment option is received, a user may alter the originally selected payment option. For example, a confirmation of the selected payment option may provide the user with an ability to change the originally selected payment option to yet another payment option (e.g., change from an originally selected rewards points payment option to an installment payment option).

A user's mobile device may be linked to the user's purchases after a transaction has been conducted. Targeted advertisements (e.g., discount coupon offers), for example, may be sent to the user's mobile phone in response to a single purchase or a pattern of multiple purchases.

A user's mobile communication device may execute one or more applications that may be linked with a user's card and/or one or more accounts associated with a user's card. In so doing, a user's interaction with his or her card may be tailored to the user's preferences via mobile applications that may be executing on the user's mobile device. For example, a user may request (e.g., via a mobile device application) that text confirmations be sent to the user's mobile device upon selection of a particular payment option. Further, a user may request (e.g., via a mobile device application) that choices be provided to the user upon selection of certain payment options (e.g., an installment payment plan may default to three monthly payments, but the user may be given the opportunity to change the plan to six monthly payments at the user's discretion).

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which:

FIG. 6 is an illustration of a mobile device constructed in accordance with the principles of the present invention;

FIG. 7 is an illustration of a mobile device constructed in accordance with the principles of the present invention.

DETAILED DESCRIPTION OF THE INVENTION

Figure 1:
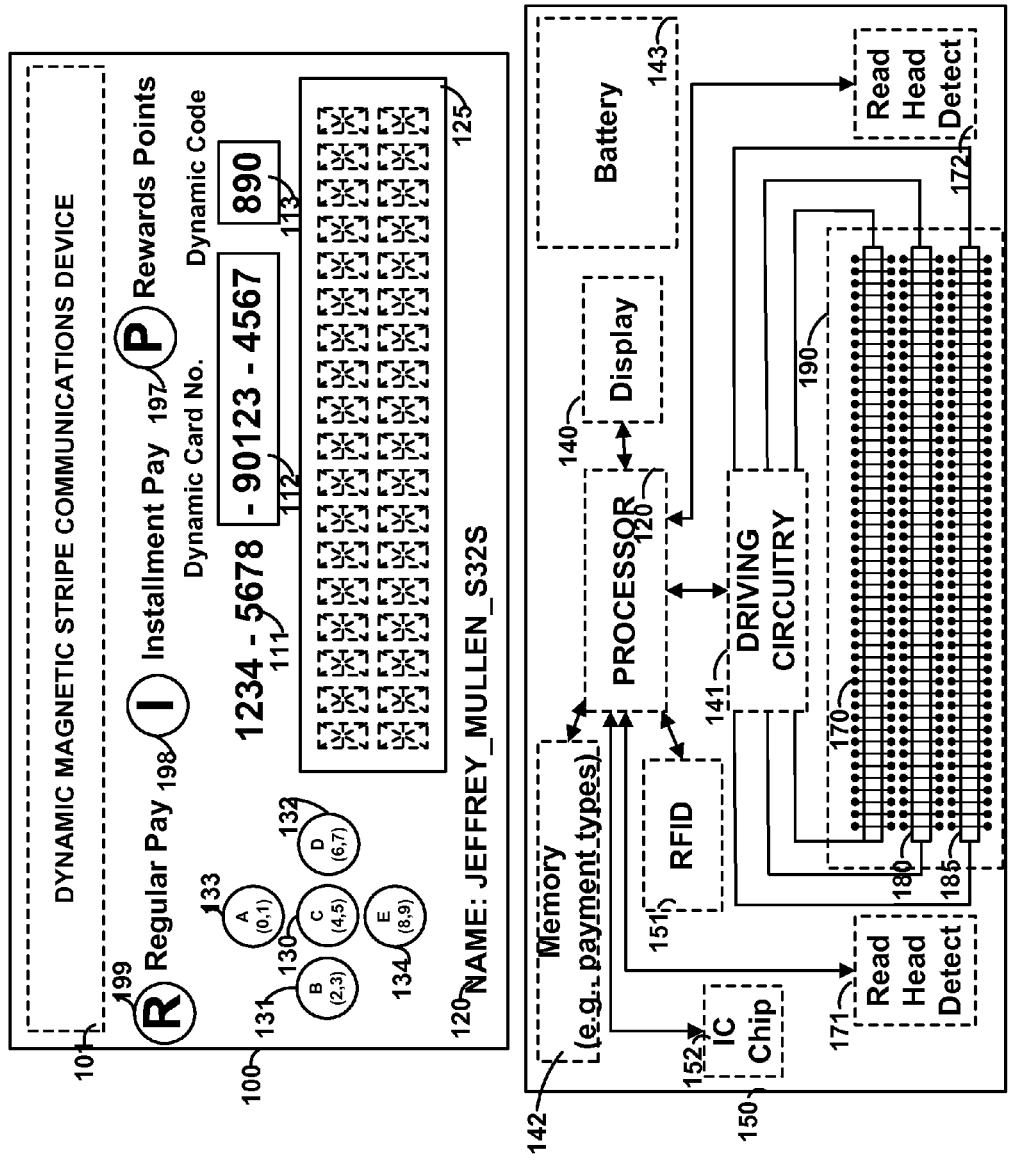
FIG. 1 is an illustration of cards constructed in accordance with the principles of the present invention.

FIG. 1 shows card 100 that may include, for example, a dynamic number that may be entirely, or partially, displayed via display 112. A dynamic number may include a permanent portion such as, for example, permanent portion 111. Permanent portion 111 may be printed as well as embossed or laser etched on card 100. Multiple displays may be provided on a card. For example, display 113 may be utilized to display a dynamic code such as a dynamic security code. Display 125 may also be provided to display logos, barcodes, as well as multiple lines of information. A display may be a bi-stable display or non bi-stable display. Permanent information 120 may also be included and may include information such as information specific to a user (e.g., a user's name or username) or information specific to a card (e.g., a card issue date and/or a card expiration date). Card 100 may include one or more buttons such as buttons 130-134. Such buttons may be mechanical buttons, capacitive buttons, or a combination or mechanical and capacitive buttons.

Card 100 may include button 199. Button 199 may be used, for example, to communicate information through dynamic magnetic stripe communications device 101 indicative of a user's desire to pay for an item on credit, but to debit the credit account for the amount from a user's bank account when the next credit statement posts (or the subsequent credit statement posts and the associated bill is due). Persons skilled in the art will appreciate that pressing a button (e.g., button 199) may cause information to be communicated through device 101 when an associated read-head detector detects the presence of a read-head of a magnetic stripe reader.

Card 100 may include button 197. Button 197 may be used, for example, to communicate information through dynamic magnetic stripe communications device 101 indicative of a user's desire to pay for an item using rewards points and/or rewards cash.

Button 198 may be utilized to communicate (e.g., after button 198 is pressed and after a read-head detects a read-head of a reader) information indicative of a user's desire to divide payment for the purchase over installments. A card may include a default number of installments (or a set dollar amount of installments such as $100). A user may change this default installment number of dollar amount online via an online website. Similarly, multiple buttons may be provided on a card and each button may be associated with a different installment option (e.g., 3 installments, 6 installments, and/or $100 installments).

Usage of buttons 197, 198, and/or 199 may be linked at the user's option to the user's mobile device (e.g., mobile phone, laptop, or PDA) upon issuance of card 100 to the user. Text messages, for example, may be communicated to a user's mobile phone to confirm selection of a particular payment option. In addition, a user may be provided with an opportunity to modify or cancel a previously selected payment option via a text messaging sequence that may be initiated through a payment option selected by pressing any one or more of buttons 197-199.

Architecture 150 may be utilized with any card. Architecture 150 may include processor 120. Processor 120 may have on-board memory for storing information (e.g., application code). Any number of components may communicate to processor 120 and/or receive communications from processor 120. For example, one or more displays (e.g., display 140) may be coupled to processor 120. Persons skilled in the art will appreciate that components may be placed between particular components and processor 120. For example, a display driver circuit may be coupled between display 140 and processor 120.

Memory 142 may be coupled to processor 120. Memory 142 may include data that is unique to a particular card. For example, memory 142 may store discretionary data codes associated with buttons of card 150. Such codes may be recognized by remote servers to effect particular actions. For example, a code may be stored on memory 142 that causes a user-defined installment plan to be setup for the purchase on a remote server (e.g., a remote server coupled to a card issuer's website). Memory 142 may store types of payments that a user may select. Each type of payment may be associated with a button. Or, for example, a user may scroll through a list of payment types on a display on the front of the card (e.g., using buttons to scroll through the list).

Any number of reader communication devices may be included in architecture 150. For example, IC chip 152 may be included to communicate information to an IC chip reader. IC chip 152 may be, for example, an EMV chip. As per another example, RFID 151 may be included to communicate information to an RFID reader.

A magnetic stripe communications device may also be included to communicate information to a magnetic stripe reader. Such a magnetic stripe communications device may provide electromagnetic signals to a magnetic stripe reader. Different electromagnetic signals may be communicated to a magnetic stripe reader to provide different tracks of data. For example, electromagnetic field generators 170, 180, and 185 may be included to communicate separate tracks of information to a magnetic stripe reader. Such electromagnetic field generators may include a coil wrapped around one or more materials (e.g., a soft-magnetic material and a non-magnetic material). Each electromagnetic field generator may communicate information serially to a receiver of a magnetic stripe reader for a particular magnetic stripe track.

Read-head detectors 171 and 172 may be utilized to sense the presence of a magnetic stripe reader (e.g., a read-head housing of a magnetic stripe reader). This sensed information may be communicated to processor 120 to cause processor 120 to communicate information serially from electromagnetic generators 170, 180, and 185 to magnetic stripe track receivers in a read-head housing of a magnetic stripe reader. Accordingly, a magnetic stripe communications device may change the information communicated to a magnetic stripe reader at any time. Processor 120 may, for example, communicate user-specific and card-specific information through RFID 151, IC chip 152, and electromagnetic generators 170, 180, and 185 to card readers coupled to remote information processing servers (e.g., purchase authorization servers). Driving circuitry 141 may be utilized by processor 120, for example, to control electromagnetic generators 170, 180, and 185.

Figure 2:
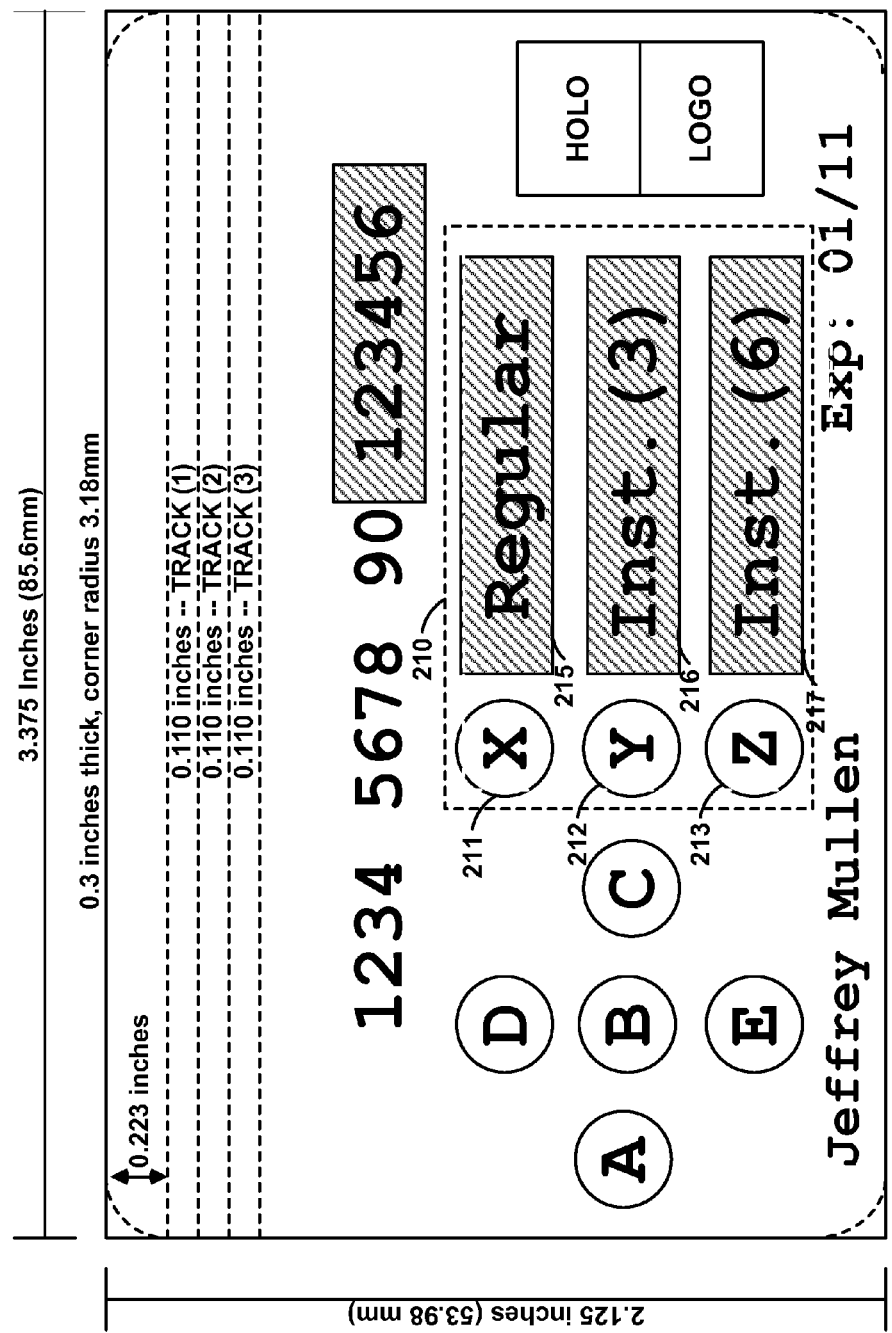
FIG. 2 is an illustration of a card constructed in accordance with the principles of the present invention.

FIG. 2 shows card 200 that includes button 211 associated with display 215, button 212 associated with display 216, and button 213 associated with display 217. Each button may be associated with a feature displayed in display 210. A user may press a button in order to communicate data representative of the feature through a magnetic stripe communications device or other communications device (e.g., RFID or IC chip). A light emitting diode (or other source of light) may be associated with each button to indicate to a user what feature was selected by a user.

A user may be able to select multiple features such that multiple feature codes are communicated in tracks of magnetic stripe data communicated by a magnetic stripe communications device. Such codes may be provided in discretionary data fields. Such codes may be repeated on each track of communicated magnetic stripe data (e.g., repeated on tracks 1 and 2 or repeated on tracks 1, 2, and 3). In doing so, a user may associate multiple features to a purchase. A user may set that a purchase be automatically paid regularly by, for example, pressing button 211 for a purchase transaction. A user may press button 212 to set that a purchase for installment payment under one installment plan (e.g., 3 equal installments). Button 213 may allow a user to set that a purchase for installment payment under another installment plan (e.g., 6 equal installments).

The features associated with each card may be pre-determined by a user. For example, a user may select features to place on a card when ordering a card. Additionally, a user may go to a card issuer's website and select attributes of features. For example, a user may visit a card issuer's website and select the particular offering that is to be purchased whenever a user selects the feature associated with button 211 and displayed on display 215.

Information associated with a button may be displayed via a display or permanently printed, embossed, or laser engraved on a card. Card 200 may include a light sensing device to receive information via light pulses from a display (e.g., a television, mobile phone, or laptop display). A user may select to change the features or attributes of features from a card issuer's website and may reconfigure a card accordingly. Alternatively, a card may be provided with buttons and no descriptive information. A user may change the features or attributes of features associated with one or more buttons via a card issuer's website and remote processing may perform the associated processing as a result of on-card button selections.

Different codes may be communicated depending on the feature or attributes of features on a card. Such codes may be changed via a wireless communications signal (e.g., a light-based communications signal). In doing so, processing may occur off-card at a remote server without the need to determine what feature a user associated with a code. Persons skilled in the art will appreciate that a card issuer may monitor the frequency and number of times that a user utilizes a particular feature. Additionally, the card may receive wireless communications signals (e.g., WiFi signals) associated with the modifications and additions).

Figure 3:
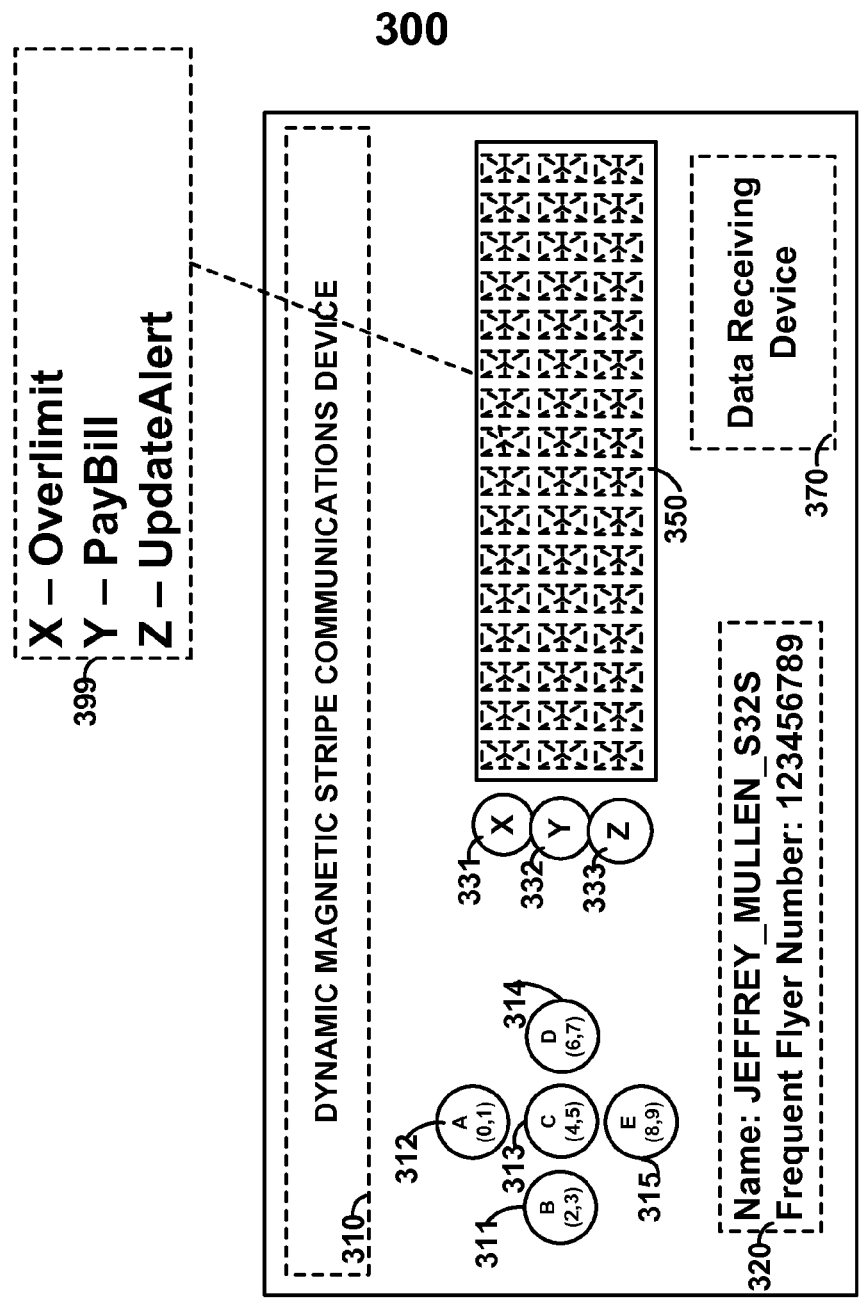
FIG. 3 is an illustration of a card constructed in accordance with the principles of the present invention.

FIG. 3 shows card 300 that may include dynamic magnetic stripe communications device 310, buttons 311-315, permanent information 320, display 350, data receiving device 370, and buttons 331-333. Button 331 may be associated with a first line of displayed information on display 350. Button 332 may be associated with a second line of displayed information on display 350. Button 333 may be associated with a third line of displayed information on display 350. Persons skilled in the art will appreciate that buttons 331-333 may actually be virtual buttons on display 350 and display 350 may be a capacitive touch screen.

Data receiving device 370 may be a light or sound sensor for receiving information through received light or sound. Portion 399 may be displayed on display 350. The first line of portion 399 may be associated with button 331 and may, for example, cause a code to be communicated (e.g., with magnetic stripe data for authorizing a purchase transaction) to a magnetic stripe reader that is associated with a user's desire to initiate an overlimit feature. Persons skilled in the art will appreciate that a user's transaction may be declined for overdrawing from the user's credit account (or other account). A user may utilize an overlimit feature to use such an overdrafted account for an additional fee. In this manner, selecting such a feature may allow a previously declined purchase transaction to be authorized and an overlimit feature fee be placed on the account.

The second line of portion 399 may be associated with, for example, button 332 of display 350 and may be a pay bill feature. A pay bill feature may cause any outstanding bill for a user's account to be paid. Accordingly, a user does not have to log into his/her online account (or mail a check) to authorize payment of an outstanding bill.

The third line of portion 399 may be utilized for a user to select an alert update feature. A card may be provided to a user with knowledge of when a bill payment is due for a user (and/or when a statement posts). An internal clock may keep track of these events and notify a user of such events. A user may select an update alert to, for example, receive information via a communications channel (e.g., via light pulses) associated with an alert. Such an update may, for example, re-synchronize the internal clock of a card (e.g., to remove any timing errors accumulated by the timing circuitry of the card). An alert may be provided, for example, if a user overdrafts from a particular account.

Figure 4:
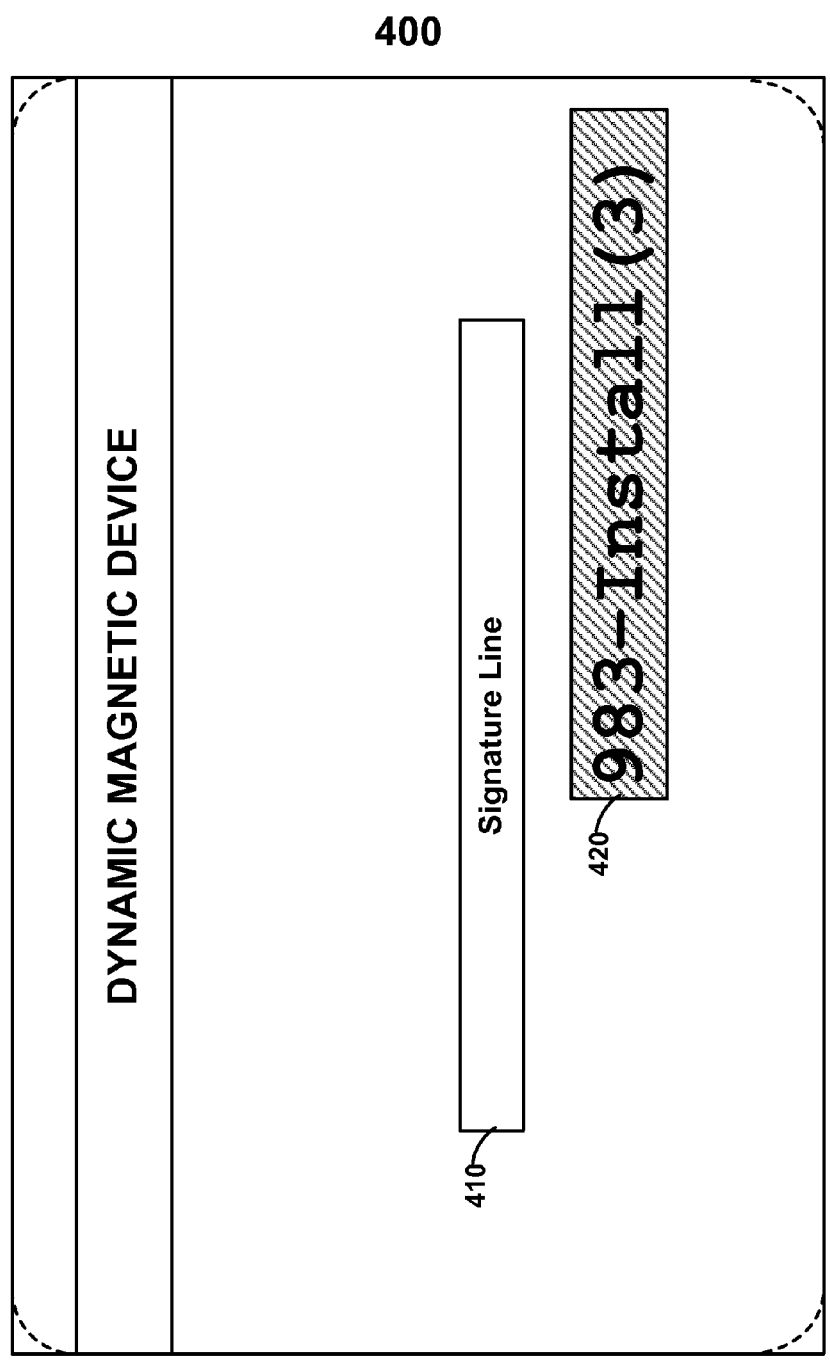
FIG. 4 is an illustration of a card constructed in accordance with the principles of the present invention.

FIG. 4 shows card 400 that may include signature line 410 and display 420. Persons skilled in the art will appreciate that card 300 of FIG. 3 may depict the obverse side of a card and card 400 of FIG. 4 may depict the reverse side of a card. Individual components of card 300 of FIG. 3 or card 400 of FIG. 4 may be provided on either side of a card or both sides of a card. More than one instance of a component may be provided on any side of a card (e.g., the same side as a component or a different side as a component). Persons skilled in the art will appreciate that a user may communicate feature codes representative of a user's on-card selection via codes that may be displayed visually and entered into a webpage as part of an online payment.

A display may display not only a code for an online payment, but also indicia representative of the feature. In doing so, the user can confirm that the right feature was selected. Persons skilled in the art will appreciate that different codes for the same feature may be displayed and communicated via a dynamic magnetic communications device. In doing so, the security of the card may be increased. Additionally, the same or different codes may be communicated on different tracks of data to represent the selection of a particular feature. A code may be utilized, for example, to communicate information about an installment plan a user desires to initiate for a purchase.

Figure 5:
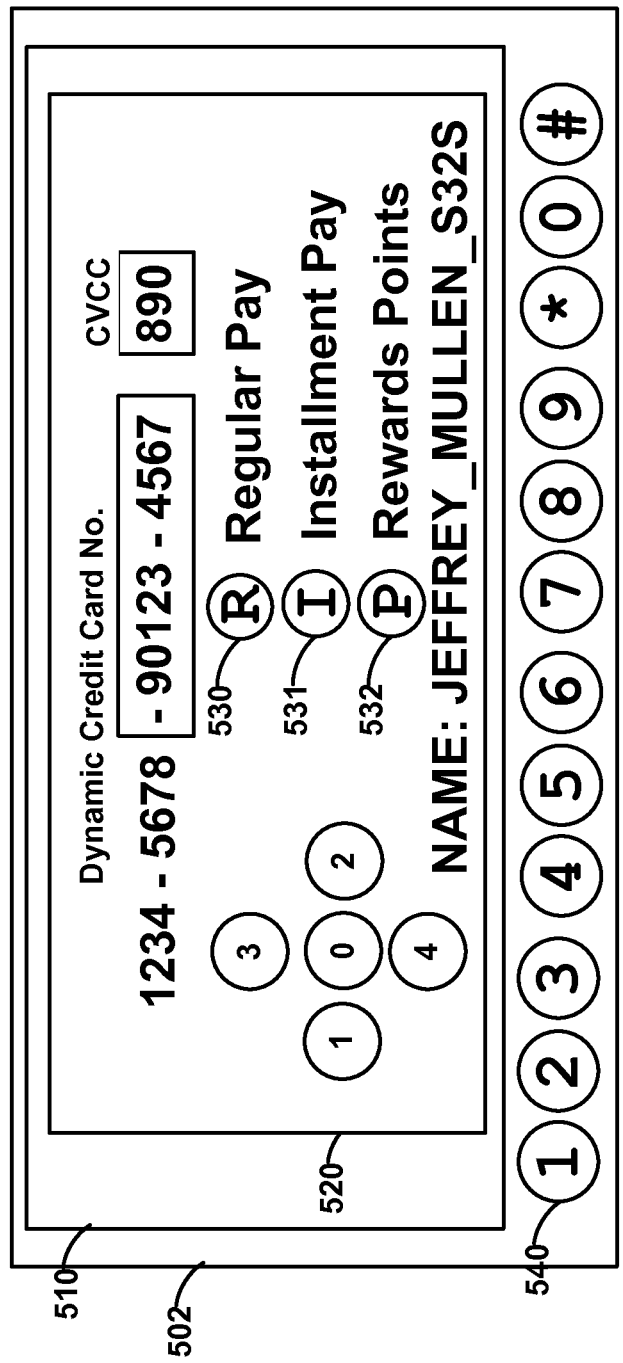
FIG. 5 is an illustration of a mobile device constructed in accordance with the principles of the present invention.

FIG. 5 shows mobile device 500, which may be a mobile telephonic device. Device 500 may include one or more physical buttons (e.g., button 540). Device 500 may include one or more display screens 510. Such a display screen may be touch sensitive such that virtual buttons (e.g., button 530) may be provided on virtual card 520. Virtual card 520 may appear similar to a physical card described herein. A user may select different virtual cards by, for example, swiping his/her finger across a touch-sensitive display to scroll to the next virtual card. Mobile phone 502 may include a communications device operable to communicate data to a card reader. For example, mobile phone 502 may include an RFID antenna to communicate to an RFID reader, a pop-out IC chip panel operable to be fed into an IC chip reader, or a magnetic communications device having a magnetic emulator operable to communicate magnetic stripe data wirelessly to a read-head of a magnetic stripe reader. Virtual button 530 may be provided to indicate a user's desire for a regular pay option for a purchase. Virtual button 531 may be provided to indicate a user's desire for an installment pay option for a purchase. Virtual button 532 may be provided to indicate a user's desire for a rewards points pay option for a purchase.

FIG. 6 shows mobile device 600, which may be a mobile telephonic device having executable applications that may be used by a user to conduct a financial transaction. Alternately, mobile device 600 may optionally be linked to a card issued to the user of mobile device 600. In either instance, the user may have previously requested (e.g., at card issuance) to receive confirmation messages during the course of any financial transaction.

A user may, for example, choose at the point of sale to finance a purchase with rewards points. Confirmatory message 604 may be received (e.g., via text messaging) by mobile device 600. In so doing, a user may have an opportunity to confirm the pending transaction using the originally selected payment option (e.g., by selecting the appropriate button 602). Conversely, the user may have an opportunity to override the user's original payment option selection by selecting an alternate payment option (e.g., installment pay or regular pay).

FIG. 7 shows mobile device 700. Message 702 may be displayed as a result of the user's original request to finance a pending transaction using an installment payment plan. A confirmation message (e.g., text message 702) may then be displayed to allow the user to confirm that a default number of installment payments (e.g., 3) is acceptable. Alternately, the user may be given the opportunity to override the default selection by selecting a different number of installments (e.g., 6 or 9 installments).

Persons skilled in the art will appreciate that users may define how confirmatory messaging may be conducted. In particular, a user may have an opportunity to visit a card issuer's website to select the user's confirmatory messaging preferences. For example, a user may simply opt out of confirmatory messaging. Alternately, a user may wish to opt into confirmatory messaging and may further define options associated with such messaging (e.g., always confirm with a default selection and a list of available options that may be selected instead of the default selection). Accordingly, a user may be able to customize a level of interaction at the point of sale via his or her confirmatory messaging preferences.

Figure 8:
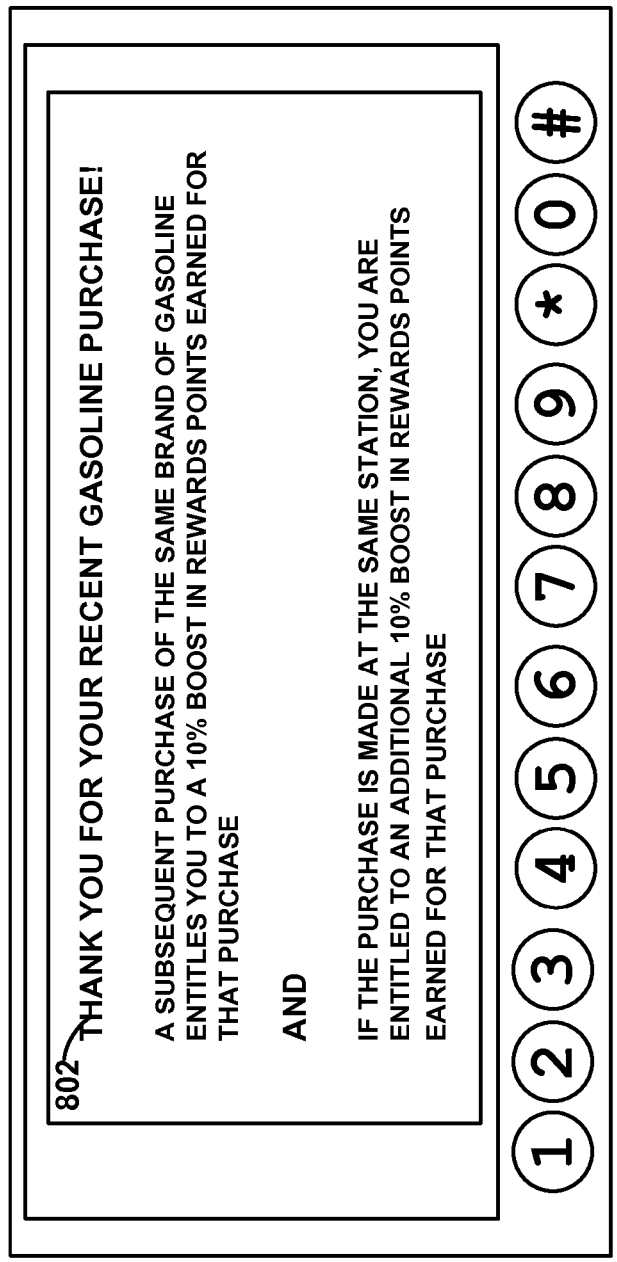
FIG. 8 is an illustration of a mobile device constructed in accordance with the principles of the present invention.

FIG. 8 shows mobile device 800. Message 802 may be displayed as a result of a targeted advertisement that may be sent (e.g., via text messaging) subsequent to a purchase. For example, message 802 may first confirm that a purchase of gasoline was transacted using a user's card or application-enabled mobile device. A promotion may be offered by the product supplier (e.g., gasoline supplier) and/or the product vendor (e.g., gasoline station) that results in targeted advertisement 802. Accordingly, the user may be informed of rewards that may be earned as a result of continued patronage.

Persons skilled in the art will also appreciate that the present invention is not limited to only the embodiments described. Instead, the present invention more generally involves dynamic information. Persons skilled in the art will also appreciate that the apparatus of the present invention may be implemented in other ways than those described herein. All such modifications are within the scope of the present invention, which is limited only by the claims that follow.

The invention claimed is:

1. A mobile device, comprising:
   a communications device operable to communicate transaction data to a card reader; and
   a display operable to display a virtual button, the virtual button operable to include option data in the transaction data, the option data associated with at least one option,
   wherein the at least one option is not a selection to immediately pay for a transaction associated with said communicated transaction data via one or more accounts.

2. The mobile device of claim 1, wherein the option data is associated with an installment plan.

3. The mobile device of claim 1, wherein the option data is associated with a default number of periodic payments.

4. The mobile device of claim 1, wherein the option data is associated with a user determined number of payments.

5. The mobile device of claim 1, wherein the option data is associated with a pay bill feature.

6. The mobile device of claim 1, further comprising a processor.

7. The mobile device of claim 1, further comprising:
   a processor; and
   an integrated circuit (IC) chip.

8. The mobile device of claim 1, further comprising:
   a processor; and
   a radio frequency identification (RFID).

9. The mobile device of claim 1, further comprising:
   a pop-out IC (Integrated Circuit) chip panel; and
   a radio frequency identification (RFID) antenna,
   wherein the communication device is a magnetic communications device.

10. The mobile device of claim 1, further comprising a clock.

11. The mobile device of claim 1, further comprising:
    a light associated with the virtual button; and
    a display.

12. The mobile device of claim 1, wherein the communication device is a wireless communication device.

13. The mobile device of claim 1, further comprising a sound sensor.

14. The card of claim 1, further comprising a light sensor.

15. The card of claim 1, wherein the virtual button is operable to include the option data in a discretionary field of track data.

16. A mobile device, comprising:
 a communications device operable to communicate transaction data to a card reader; and
 a display operable to display a virtual button, the virtual button operable to include option data in the transaction data,
 wherein the option data includes a code associated with server instructions to pay an outstanding bill of a user.

17. A mobile device, comprising:
 a communications device operable to communicate transaction data to a card reader; and
 a display operable to display a virtual button, the virtual button operable to include option data in the transaction data,
 wherein the option data includes a code associated with server instructions to pay a current credit card bill of a user.

18. A mobile device, comprising:
 a communications device operable to communicate transaction data to a card reader; and
 a display operable to display a virtual button, the virtual button operable to include option data in the transaction data,
 wherein the option data includes a code associated with a request for authorization of a transaction associated with an overdrafted account.

19. A mobile device, comprising:
 a communications device operable to communicate transaction data to a card reader; and
 a display operable to display a virtual button, the virtual button operable to include option data in the transaction data,
 wherein the option data includes a code associated with server instructions to periodically bill a user for a transaction.

20. The A mobile device, comprising:
 a communications device operable to communicate transaction data to a card reader; and
 a display operable to display a virtual button, the virtual button operable to include option data in the transaction data,
 wherein the option data includes a code associated with a request to a server to authorize a declined transaction.

* * * * *